United States Patent
Yamashita et al.

[11] Patent Number: 5,973,457
[45] Date of Patent: Oct. 26, 1999

[54] LIGHTING CIRCUIT FOR DISCHARGE LAMP

[75] Inventors: Masayasu Yamashita; Atsushi Toda; Jun Yabuzaki, all of Shimizu, Japan

[73] Assignee: Koito Manufacturing Co., Ltd., Tokyo, Japan

[21] Appl. No.: 09/078,812

[22] Filed: May 14, 1998

[30] Foreign Application Priority Data

May 15, 1997 [JP] Japan ................................. 9-125418

[51] Int. Cl.$^6$ .................................................. H05B 37/00
[52] U.S. Cl. ...................... 315/225; 315/307; 315/308; 315/224; 315/127; 313/318; 361/760
[58] Field of Search .................................... 315/307, 308, 315/291, 224, 127; 313/318; 361/760

[56] References Cited

U.S. PATENT DOCUMENTS

| | | | |
|---|---|---|---|
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,177,397 | 1/1993 | Nagasawa et al. | 313/318 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/308 |
| 5,438,480 | 8/1995 | Yamashita | 361/760 |
| 5,449,973 | 9/1995 | Yamashita et al. | 315/82 |
| 5,485,059 | 1/1996 | Yamashita et al. | 315/307 |
| 5,486,740 | 1/1996 | Yamashita et al. | 315/308 |
| 5,514,935 | 5/1996 | Oda et al. | 315/82 |
| 5,565,743 | 10/1996 | Yamashita et al. | 315/310 |
| 5,572,094 | 11/1996 | Yamashita et al. | 315/308 |
| 5,629,588 | 5/1997 | Oda et al. | 315/308 |
| 5,663,613 | 9/1997 | Yamashita et al. | 315/308 |
| 5,705,898 | 1/1998 | Yamashita et al. | 315/308 |
| 5,828,177 | 10/1998 | Toda et al. | 315/127 |
| 5,880,563 | 3/1999 | Toyama et al. | 315/225 |
| 5,907,224 | 5/1999 | Yamashita et al. | 315/308 |

*Primary Examiner*—Don Wong
*Assistant Examiner*—Tuyet Vo
*Attorney, Agent, or Firm*—Sughrue, Mion, Zinn, Macpeak & Seas, PLLC

[57] ABSTRACT

A lighting circuit for a discharge lamp is designed in such a way that a detection time for the flicker state of a discharge lamp is not affected by the light-OFF time at the time the discharge lamp flickers without causing a significant increase in cost. This lighting circuit 1 for a discharge lamp comprises detection means 5 for detecting a flicker state of a discharge lamp 3; and abnormality determining means 6 for determining an abnormality in the discharge lamp 3 in accordance with a detection signal from the detection means 5 and implementing display to that effect, or stopping power supply to the discharge lamp 3, whereby when the detection signal from the detection means 5 indicates repetition of a state where a light-OFF time of the discharge lamp 3 is equal to or greater than a first set time and a light-ON time of the discharge lamp 3 is equal to or less than a second set time is repeated a predetermined period or longer, or a predetermined number of times or more, the abnormality determining means 6 determines the state as abnormal lighting of the discharge lamp 3.

14 Claims, 5 Drawing Sheets

LIGHTING CIRCUIT FOR DISCHARGE LAMP

BACKGROUND OF THE INVENTION

FIELD OF THE INVENTION

The present invention relates to a lighting circuit equipped with detection means for detecting the flickering state of a discharge lamp.

DESCRIPTION OF THE RELATED ART

Recently, greater attention is being paid to a compact discharge lamp (a metal halide lamp or the like) as a light source for vehicular lamps. A known lighting circuit includes a DC power supply, a switching power supply circuit, and a DC-AC converter.

The conventional lighting circuit has such a shortcoming that when a discharge lamp falls into a flicker state due to its life coming to an end or some external factor, this state continues.

This undesirable phenomenon may be avoided by providing the lighting circuit with detection means for detecting if a discharge lamp is in a light-ON state based on the lamp current of the discharge lamp and a capacitor which is charged and discharged according to a binary signal from the detection means, whereby the value of the terminal voltage of the capacitor is compared with a predetermined threshold value to detect if the discharge lamp has fallen into a flicker state and power supply to the discharge lamp is inhibited when the flicker state is detected.

This circuit however still suffers the following inconveniences.

(i) A detection time for the flicker state of a discharge lamp varies by the time ratio (duty cycle) of the light-OFF time at the time the discharge lamp flickers.

(ii) The capacitance of the capacitor should be set large to set the detection time long enough for a user to be able to sufficiently notice the flicker state of a discharge lamp.

With regard to the inconvenience (i), as apparent from a graph g in FIG. 6 in which the horizontal scale represents the duty cycle of the light-OFF time at the time the discharge lamp flickers or the ratio of the light-OFF time in one flicker period (which is denoted by "DS") and the vertical scale represents the detection time (denoted by "TS"), the detection time is short in a flicker state with large DS as indicated to point a, so that power supply to the discharge lamp is inhibited immediately by the detection signal. When the discharge lamp becomes off before a user notices the flickering of the discharge lamp, the user cannot grasp that flickering is caused by the expiration of the life of the discharge lamp or the like, and cannot thus find that the discharge lamp needs to be replaced. To avoid such an inconvenience, it is necessary to enlarge the capacitance of the capacitor as specified in the paragraph (ii), resulting in an increase in cost.

Accordingly, it is an object of the present invention to prevent a detection time for the flicker state of a discharge lamp from being affected by the light-OFF time at the time the discharge lamp flickers without causing a significant increase in cost.

SUMMARY OF THE INVENTION

To achieve the object, a lighting circuit for a discharge lamp is designed in such a way that when a detection signal from detection means for detecting a flicker state of a discharge lamp indicates repetition of a state where a light-OFF time of the discharge lamp is equal to or greater than a first set time and a light-ON time of the discharge lamp is equal to or less than a second set time, abnormality determining means determines the state as abnormal lighting of the discharge lamp.

According to this invention, the light-OFF time and the light-ON time of a discharge lamp are compared with associated set times and whether or not lighting of the discharge lamp is abnormal is not determined until repetition of the comparison result is detected. The detection time is not therefore affected by the time ratio of the light-OFF time in the flicker period of the discharge lamp.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENT

Basic Constitution

Figure 1:
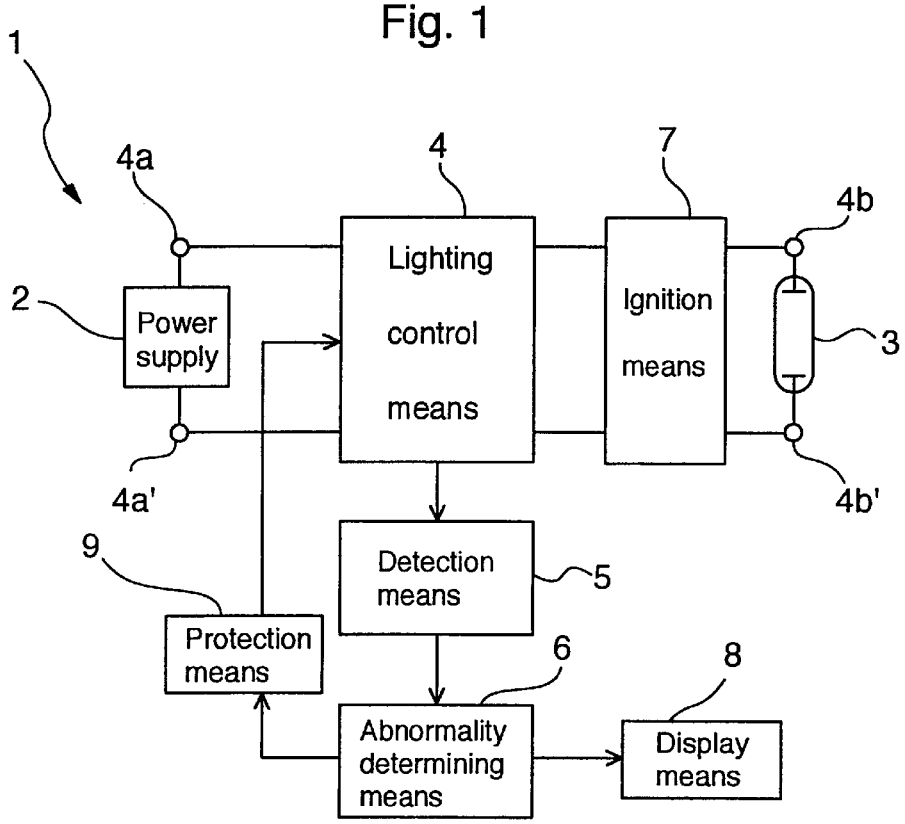
FIG. 1 is a circuit block diagram showing a basic constitution according to this invention.

FIG. 1 shows the basic constitution of a lighting circuit according to this invention. This lighting circuit 1 comprises lighting control means 4 which performs lighting control of a discharge lamp 3 based on a voltage supplied from a power supply 2, detection means 5 which detects the flicker state of the discharge lamp 3, and abnormality determining means 6, which determines an abnormality in the discharge lamp 3 in accordance with a detection signal from the detection means 5 and implements display to that effect, or stops power supply to the discharge lamp 3.

The power supply 2 is either a DC power supply or an AC power supply, and is connected to input terminals 4a and 4a' of the lighting control means 4. The discharge lamp 3 is connected to output terminals 4b and 4b' of the lighting control means 4, which carries out power control of the discharge lamp 3. The lighting control means 4, which has a constitution of a known system (sine-wave lighting system, square-wave lighting system or the like), performs control for progressive light emission from the discharge lamp by, for example, supplying greater power than the rated power of the discharge lamp at the beginning of lighting of the discharge lamp 3 or performs stable constant power control when the discharge lamp 3 is in a steady lighting mode.

Provided at the subsequent stage of the lighting control means 4 is ignition means 7 which applies a high-voltage pulse (ignition pulse) to the discharge lamp to ignite the discharge lamp 3.

The detection means 5 detects if the discharge lamp 3 falls into a flicker state due to the lamp's life coming to an end or some other cause. Based on a detection signal on the lamp current or lamp voltage of the discharge lamp 3, for example, the detection means 5 determines whether the discharge lamp 3 is on or off.

When a state where the light-OFF time of the discharge lamp is equal to or greater than a first set time (hereinafter denoted by "T1") and the light-ON time of the discharge lamp is equal to or less than a second set time (hereinafter denoted by "T2") is repeated, the abnormality determining means 6 determines the state as abnormal lighting of the discharge lamp based on the detection signal from the detection means 5 which is acquired when the discharge lamp 3 flickers.

Figure 2:
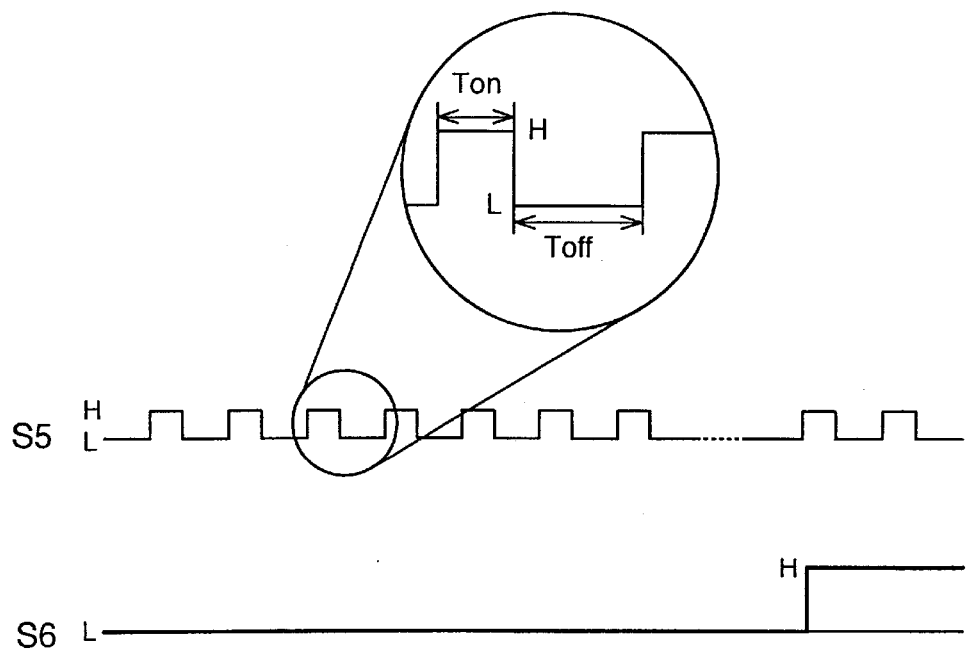
FIG. 2 is a time chart for explaining the operation of abnormality determining means.

FIG. 2 is an explanatory diagram for the operation of the abnormality determining means 6; a signal S5 indicates the detection signal obtained by the detection means 5 and S6 is an output signal indicating the result of determination by the abnormality determining means 6.

As apparent from the enlarged circle in the diagram, a period in which the signal S5 is an H (High) signal (which is denoted by "Ton") indicates that the discharge lamp 3 is in the light-ON state, and a period in which the signal S5 is an L (Low) signal (which is denoted by "Toff") indicates that the discharge lamp 3 is in the light-OFF state.

When the state of Toff≧T1 and Ton≦T2 is repeated, the abnormality determining means 6 determines that abnormal lighting of the discharge lamp 3 has occurred, and sets the signal S6, for example, to an H signal.

The repetition of the state of Toff≧T1 and Ton≦T2 can be determined by the sustained time for this state or the number of times of occurrence of the state. If one wants to determine the repetition of the state based on the sustained time, abnormal lighting of the discharge lamp should be determined when the state of Toff≧T1 and Ton≦T2 is repeated over a third set time (denoted by "T3"). If one wants to determine the repetition of the state based on the number of repetitions of the state, abnormal lighting of the discharge lamp should be determined when the state of Toff≧T1 and Ton≦T2 is repeated a predetermined number of times (denoted by "CN") or more.

It is preferable to specify the set values for the aforementioned T1 to T3 and CN in light of the mechanism that is associated with flickering of a discharge lamp. When the life of a discharge lamp comes to an end, for example, the discharge lamp is lit temporarily by the ignition pulse but goes off as it becomes difficult to maintain the lighting state due to the subsequent reduction in lamp current. At this time, the lighting control means 4 repeatedly activates the ignition means 7 to reignite the discharge lamp to turn it on, causing the discharge lamp to flicker.

It is therefore preferable to set the set time T1 shorter than the minimum time needed for the ignition means 7 to ignite the discharge lamp 3 but with a sufficient noise margin (in order to reduce electromagnetic interference or the like).

The set time T2 should be set to the light-ON time that allows a user to notice the flicker state (including glimmers), with respect to the light-OFF time Toff of the discharge lamp.

The set time T3 should be set to a time (considerably longer than T1 and T2) long enough for the user to comprehend the necessity to take a predetermined action, such as replacement of the discharge lamp, from the occurrence of a flicker state when the discharge lamp periodically repeats the light-OFF state for the set time T1 and the light-ON state for the set time T2. The set number CN is to be set along the same line of thought.

The abnormality determining means 6 determines abnormal lighting of the discharge lamp 3 and gives display to that effect on display means 8 or stops supplying power to the discharge lamp 3 by means of protection means 9. The protection means 9 may be implemented by providing switch means (relay contact, a semiconductor switch element or the like) on the power supply line to the lighting control means 4 from the power supply 2 and controlling the ON/OFF action of the switch means, or by providing a constant power supply circuit, which generates a predetermined supply voltage based on the voltage from the power supply 2 and supplies the generated voltage to the components of the lighting control means 4, and controlling the enabling/disabling of the constant power supply circuit. The latter scheme does not have a problem associated with the contact capacitance and the withstand voltage of switch means, and can carry out control to permit or inhibit power supply to the discharge lamp relatively easily without complicating the circuit constitution or involving a significant cost increase.

Embodiment

Figure 3:
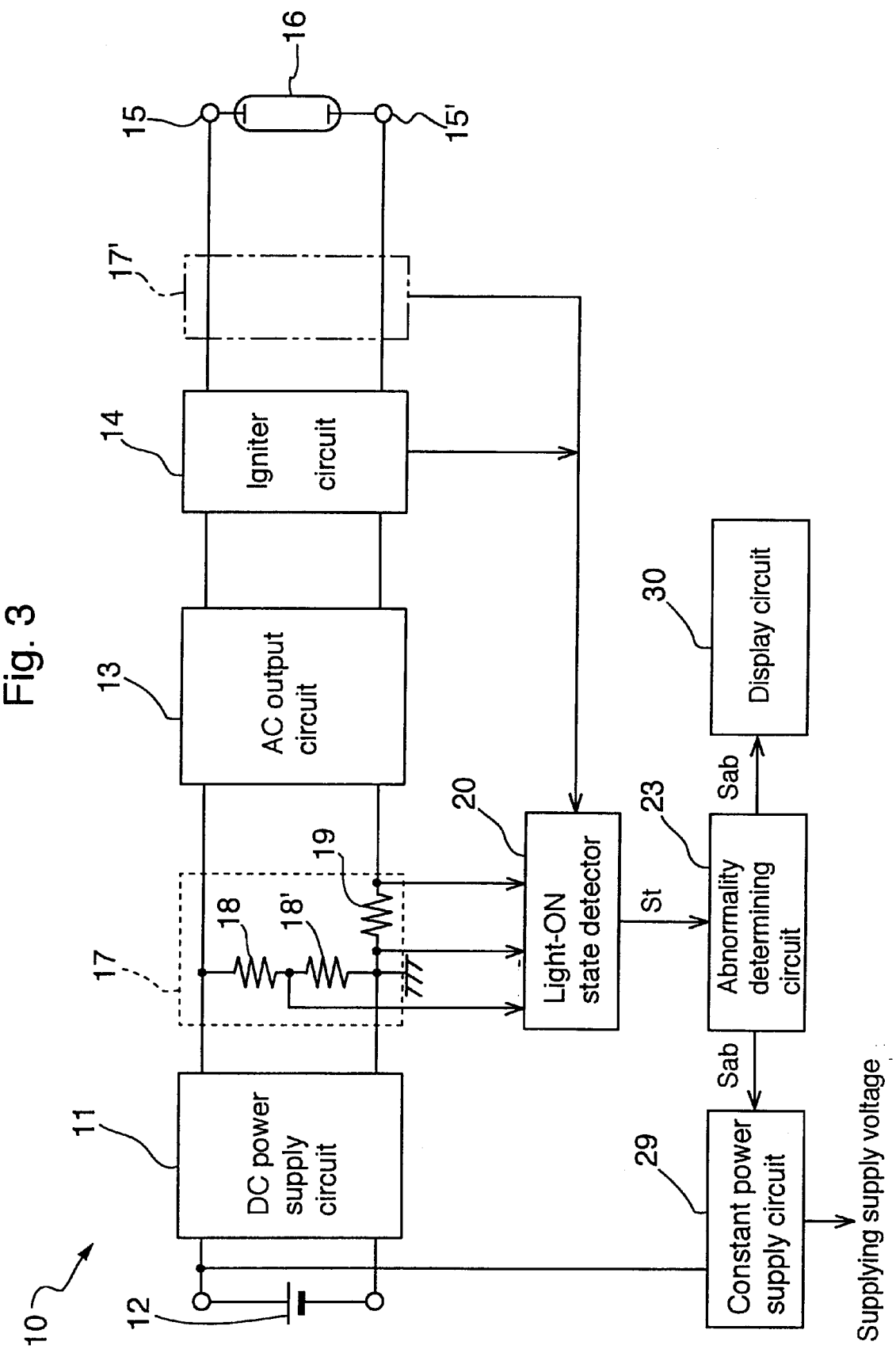
FIG. 3 is a circuit block diagram illustrating, together with FIGS. 4 and 5, one embodiment of this invention.
Figure 4:
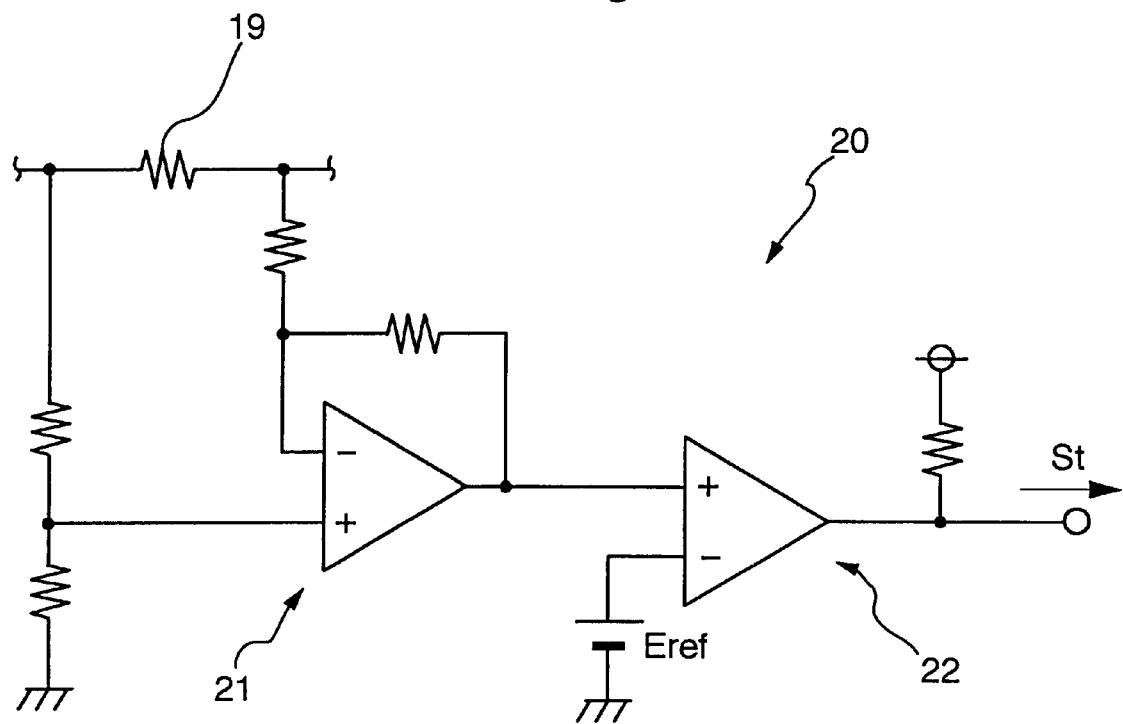
FIG. 4 is a circuit diagram exemplifying the constitution of a light-ON state detector.
Figure 5:
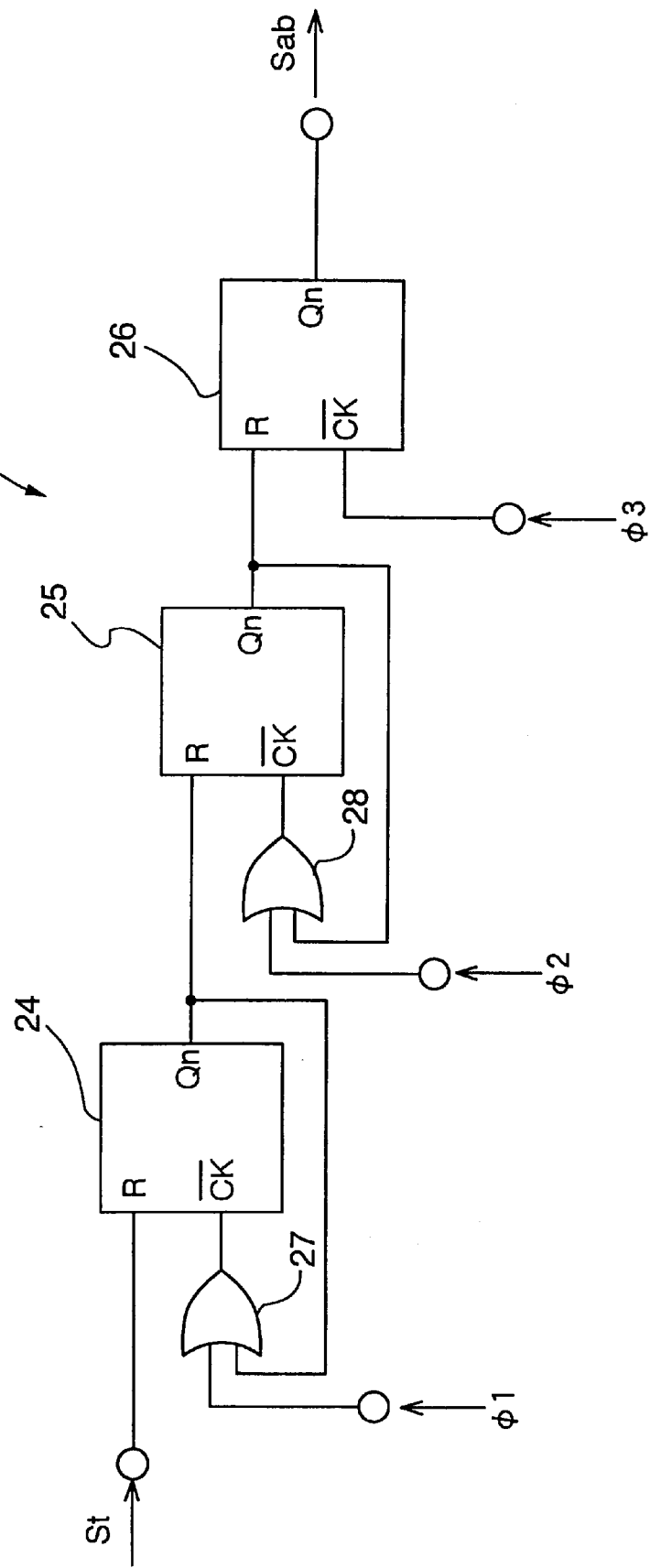
FIG. 5 is a circuit diagram exemplifying the constitution of an abnormality determining circuit.
Figure 6:
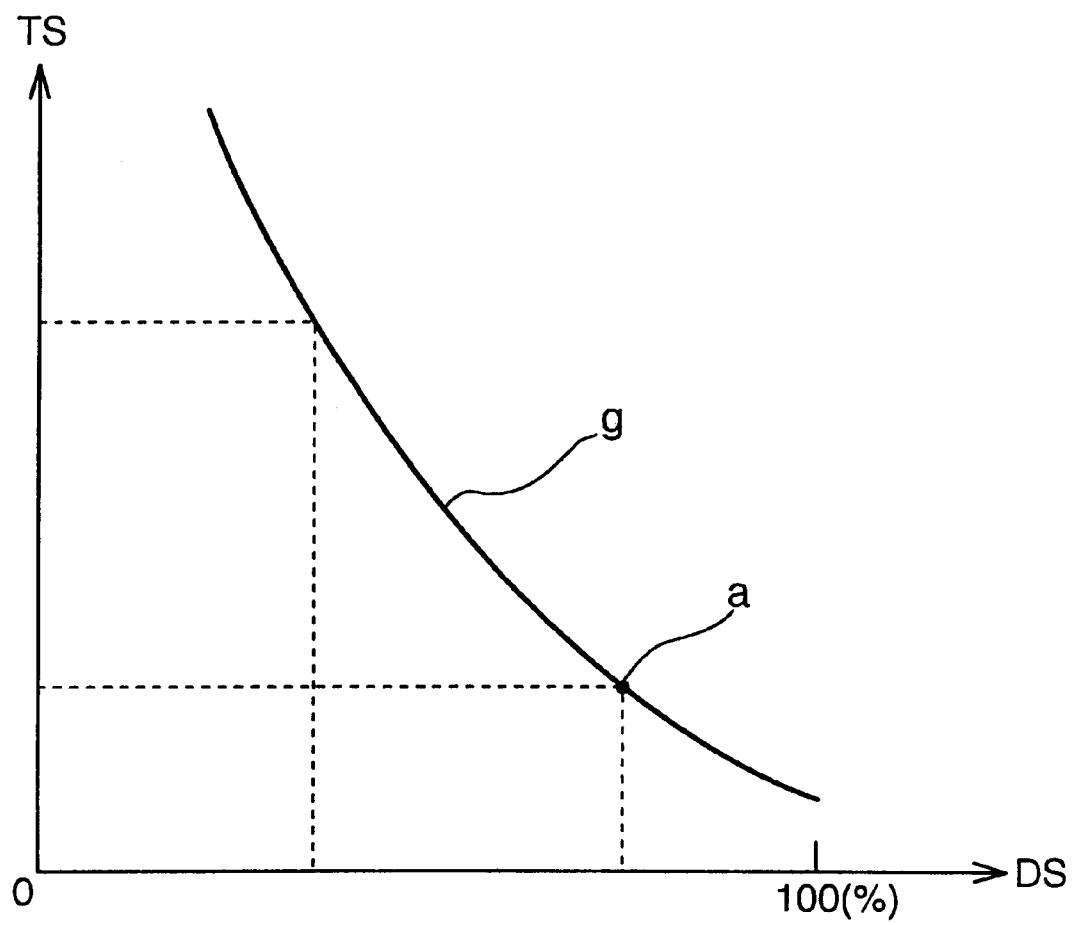
FIG. 6 is a graph showing the relationship between the ratio of a light-OFF state in the flicker period of a discharge lamp and a detection time for the flicker state.

FIGS. 3 through 5 illustrate one embodiment of this invention as adapted to a lighting circuit of an AC lighting system.

In a lighting circuit 10 shown in FIG. 3, a DC power supply circuit 11 generates a desired DC voltage based on the voltage from a DC power supply 12, and supplies the DC voltage to an AC output circuit 13 at the subsequent stage. The DC power supply circuit 11 may take the constitution of a switching power supply circuit or other known constitutions such as a chopper type, forward type, flyback type, half bridge type and full bridge type.

The AC output circuit 13, which generates an AC voltage to be supplied to a discharge lamp 16, may be a circuit which has, for example, plural pairs of 3-terminal semiconductor switch elements arranged in a bridge type constitution and separated into plural sets, and performs reciprocal switching control on those sets of semiconductor switch elements to output a rectangular wave.

An igniter circuit 14 generates an ignition pulse to the discharge lamp 16, superimposes this ignition pulse on the output voltage of the AC output circuit 13, and applies the resultant pulse to the discharge lamp 16, connected between AC output terminals 15 and 15' to ignite the discharge lamp 16.

A current/voltage detector 17 acquires an equivalent signal to the lamp voltage or the lamp current of the discharge lamp 16. For example, the current/voltage detector 17, provided between the DC power supply circuit 11 and the AC output circuit 13 as illustrated, detects the output voltage of the DC power supply circuit 11 by means of voltage-dividing resistors 18 and 18' for voltage detection, or detects the output current of the DC power supply circuit 11 by means of a shunt resistor 19 for current detection. This current/voltage detector may be provided at the subsequent stage of the AC output circuit 13 as indicated by a block 17' (indicated by the two-dot chain line in the diagram) so as to be able to directly detect the lamp voltage or the lamp current of the discharge lamp 16. The current/voltage detector 17' is not necessary when a current/voltage detector provided inside the igniter circuit 14 or the like is used. The signal that is acquired by the detector 17 or 17' is used as basic information for a control circuit (not shown) which executes power control on the discharge lamp 16 by controlling the output voltage of the DC power supply circuit 11 (e.g., to ensure progressive light emission from the discharge lamp 16 at the initial lighting stage to shorten the ignition time or reignition time of the discharge lamp 16, and to permit the discharge lamp to be lit on the rated power after a flux of light from the discharge lamp becomes stable).

A light-ON state detector 20 detects whether or not the discharge lamp 16 is in a light-ON state based on the detection signal from the current/voltage detector 17 or 17', and is equivalent to the aforementioned detection means 5. As shown in FIG. 4, for example, the detected current across the shunt resistor 19 is amplified by a differential amplifier 21 whose output is in turn supplied to the positive input terminal of a comparator 22. Supplied to the negative input terminal of the comparator 22 is a reference voltage (denoted by "Eref" which in the diagram represents the constant voltage source) which defines a threshold value to be compared with the other input. The comparison output of the comparator 22 is taken as a detection signal (which is denoted by "St"). The non-inverting input terminal of an operational amplifier which constitutes the differential amplifier 21 is connected to one end of the shunt resistor 19 via voltage-dividing resistors, while the other end of the shunt resistor 19 is connected to the inverting input terminal of the operational amplifier via a resistor.

In this circuit, with the reference voltage Eref set, an H signal indicating the discharge lamp 16 being in the light-ON state is obtained as the output signal of the comparator 22 when the detected value associated with the lamp current is equal to or greater than Eref, and an L signal indicating the discharge lamp 16 being in the light-OFF state (or the current leaking from the discharge lamp) is obtained as the output signal of the comparator 22 when the detected value associated with the lamp current is less than Eref.

An abnormality determining circuit 23 determines abnormal lighting of the discharge lamp 16 based on the detection signal from the light-ON state detector 20 and is equivalent to the abnormality determining means 6.

FIG. 5 exemplifies the constitution of the abnormality determining circuit 23, which has three counters 24, 25 and 26.

The counter 24 at the first stage receives the detection signal St at its reset terminal (R), and receives from a 2-input OR gate 27 a logic sum signal of a clock signal (denoted by "f1") from an unillustrated signal generator and a signal from a predetermines-stage output terminal (Qn) of the counter 24 at a negative-edge-trigger clock signal input terminal (indicated by affixing "-" above CK). The set time for this counter 24 is denoted by "ST1."

The counter 25 at the next stage receives the Qn output of the counter 24 at its reset terminal (R), and receives from a 2-input OR gate 28 a logic sum signal of a clock signal (denoted by "f2") from the unillustrated signal generator and a signal from a predetermines-stage output terminal (Qn) of the counter 25 at a negative-edge-trigger clock signal input terminal (indicated by affixing "-" above CK). The set time for this counter 25 is denoted by "ST2."

The counter 26 at the last stage receives the Qn output of the counter 25 at its reset terminal (R), receives a clock signal (denoted by "f3") from the unillustrated signal generator at a negative-edge-trigger clock signal input terminal (indicated by affixing "-" above CK), and outputs an abnormal decision signal (denoted by "Sab") from a predetermines-stage output terminal (Qn) of the counter 26. The set time for this counter 26 is denoted by "ST3."

When the discharge lamp 16 goes off over the time ST1 or longer (i.e., when the signal St is an L signal), therefore, the Qn output of the counter 24 in this circuit becomes an H signal.

When the counter 25 does not receive the H signal from the counter 24 within the time ST2, its Qn output becomes an H signal.

Because the counter 26 is reset by the H signal from the counter 25, when the signal from the counter 25 is an L signal, the counter 26 counts the clock signal f3 and outputs an H signal as the signal Sab after the time ST3 elapses. In other words, when the H signal (the Qn output of the counter 24) indicating that the light-OFF time of the discharge lamp 16 is equal to or greater than ST1 is not acquired within a period of ST3 (this case includes a case where the light-OFF time of the discharge lamp is less than ST1 and a case where the light-ON time of the discharge lamp is too long to acquire the H signal within the time ST2 even if the light-OFF time of the discharge lamp is equal to or greater than ST1), the Qn output of the counter 25 becomes an H signal, resetting the counter 26 so that the signal Sab becomes an L signal. The signal Sab becomes an H signal when acquisition of the H signal indicating that the light-OFF time of the discharge lamp is equal to or greater than ST1 within the period of ST2 is repeated consecutively over the time ST3 or longer.

As apparent from FIG. 3, this signal Sab is sent to a constant power supply circuit 29 to be used to block power supply to the individual circuits from the constant power supply circuit 29 or is sent to a display circuit 30 to display information or the like to inform the user of the occurrence of abnormality or request replacement of the discharge lamp.

According to this invention, as apparent from the foregoing description, the light-OFF time and the light-ON time of a discharge lamp are compared with their associated set times and whether or not lighting of the discharge lamp is abnormal is not determined until repetition of the comparison result is detected. This can prevent the discharge lamp from being left flickering. Further, the detection time is not affected by the time ratio of the light-OFF time in the flicker period of the discharge lamp, and a user can sufficiently notice the flicker state of the discharge lamp within the period where the comparison result is repeated consecutively. This feature can be accomplished by a circuit constitution for implementing simple operations like comparison and counting, and do not thus involve a significant increase in cost.

According to a specific example of this invention, decision on abnormal lighting of a discharge lamp is made easily by checking if the result of comparison between the light-OFF time and the light-ON time of the discharge lamp when it is flickering and their associated set times has been repeated over the third set time or longer. It is therefore possible to perform such control as to permit the flicker state of the discharge lamp to be repeated over at least the third set time.

According to another specific example of this invention, decision on abnormal lighting of a discharge lamp can be made easily by checking if the result of comparison between the light-OFF time and the light-ON time of the discharge lamp when it is flickering and their associated set times has been repeated a predetermined number of times or more, and the circuit constitution can be simplified.

It should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. A lighting circuit for a discharge lamp, comprising:

detection means for detecting a flicker state of a discharge lamp; and abnormality determining means for determining an abnormality in said discharge lamp in accordance with a detection signal from said detection means and implementing display to that effect, or stopping power supply to said discharge lamp, whereby when said detection signal from said detection means indicates repetition of a state where a light-OFF time of said discharge lamp is equal to or greater than a first set time and a light-ON time of said discharge lamp is equal to or less than a second set time, said abnormality determining means determines said state as abnormal lighting of said discharge lamp.

2. The lighting circuit according to claim 1, wherein when a state where said light-OFF time of said discharge lamp is equal to or greater than said first set time and said light-ON time of said discharge lamp is equal to or less than said second set time is repeated over a third set time or longer, said abnormality determining means determines said state as abnormal lighting of said discharge lamp.

3. The lighting circuit according to claim 1, wherein when a state where said light-OFF time of said discharge lamp is equal to or greater than said first set time and said light-ON time of said discharge lamp is equal to or less than said second set time is repeated a predetermined number of times or more, said abnormality determining means determines said state as abnormal lighting of said discharge lamp.

4. The lighting circuit according to claim 1, wherein said first set time is shorter than a minimum time needed for ignition means to ignite said discharge lamp and having a sufficient noise margin.

5. The lighting circuit according to claim 1, wherein said second set time is set to such a light-ON time that allows a user to notice said flicker state with respect to said light-OFF time of said discharge lamp.

6. The lighting circuit according to claim 2, wherein said third set time is set to a time longer than said first and second set times and long enough for a user to comprehend a necessity to take a predetermined action from an occurrence of said flicker state where said discharge lamp periodically repeats a light-OFF state for said first set time and a light-ON state for said second set time.

7. The lighting circuit according to claim 3, wherein said predetermined number is set to a number large enough for user to comprehend a necessity to take a predetermined action from an occurrence of said flicker state where said discharge lamp periodically repeats a light-OFF state for said first set time and a light-ON state for said second set time.

8. The lighting circuit according to claim 1, wherein said detection means determines whether said discharge lamp is on or off based on a detection signal representing a lamp current or a lamp voltage of said discharge lamp.

9. The lighting circuit according to claim 2, wherein said detection means determines whether said discharge lamp is on or off based on a detection signal representing a lamp current or a lamp voltage of said discharge lamp.

10. The lighting circuit according to claim 3, wherein said detection means determines whether said discharge lamp is on or off based on a detection signal representing a lamp current or a lamp voltage of said discharge lamp.

11. The lighting circuit according to claim 4, wherein said detection means determines whether said discharge lamp is on or off based on a detection signal representing a lamp current or a lamp voltage of said discharge lamp.

12. The lighting circuit according to claim 5, wherein said detection means determines whether said discharge lamp is on or off based on a detection signal representing a lamp current or a lamp voltage of said discharge lamp.

13. The lighting circuit according to claim 6, wherein said detection means determines whether said discharge lamp is on or off based on a detection signal representing a lamp current or a lamp voltage of said discharge lamp.

14. The lighting circuit according to claim 7, wherein said detection means determines whether said discharge lamp is on or off based on a detection signal representing a lamp current or a lamp voltage of said discharge lamp.

* * * * *